United States Patent

Greatbatch

[15] 3,648,707

[45] Mar. 14, 1972

[54] MULTIMODE CARDIAC PACES WITH P-WAVE AND R-WAVE SENSING MEANS

[72] Inventor: Wilson Greatbatch, Clarence, N.Y.
[73] Assignee: Medtronic, Inc., Minneapolis, Minn.
[22] Filed: July 16, 1969
[21] Appl. No.: 842,290

[52] U.S. Cl. .................................................... 128/419 P
[51] Int. Cl. ...................................................... A61n 1/36
[58] Field of Search ............................. 128/419 P, 421, 422

[56] References Cited

UNITED STATES PATENTS

| | | | |
|---|---|---|---|
| 3,433,228 | 3/1969 | Keller, Jr. | 128/419 P |
| 3,253,596 | 5/1966 | Keller, Jr. | 128/419 P |
| 3,528,428 | 9/1970 | Berkovits | 128/419 P |

FOREIGN PATENTS OR APPLICATIONS

| | | | |
|---|---|---|---|
| 1,082,752 | 9/1967 | Great Britain | 128/419 P |

OTHER PUBLICATIONS

Fischler et al. " Institute of Electric and Electronic Engineers" Transactions on BioMedical Engineering Vol. BME 16, No. 1, Jan. 1969

Castillo et al. " Chest" Vol. 59, No. 4, Apr. 1971 pp. 360-364

Primary Examiner—William E. Kamm
Attorney—Lew Schwartz and Donald R. Stone

[57] ABSTRACT

A cardiac pacer including a pulse generator having an R-C circuit for controlling the generation of stimulating pulses. An electrode surgically placed on or in the ventricle of the heart is coupled to the output of the pulse generator. A reference or indifferent electrode is subcutaneously implanted and coupled to the pacer circuits. When no cardiac electrical activity exists stimulating pulses are provided at a preset rate. The ventricular electrode is coupled to the input of a first signal responsive circuit and to the pulse generator. In response to ventricular electrical signals of either polarity, for example R-waves, the first signal responsive circuit resets the R-C circuit in the pulse generator to a predetermined level inhibiting the subsequent generation of impulses for a suitable time such as one second. Another electrode surgically placed on or in the atrium of the heart is coupled to the input of a second signal responsive circuit which includes timing means and which is connected in controlling relation to the pulse generator. In response to atrial electrical signals, known as P-waves, and in the absence of ventricular electrical signals, the second signal responsive circuit causes the pulse generator to provide time-delayed stimulating pulses synchronized with the atrial beats.

17 Claims, 5 Drawing Figures

Patented March 14, 1972

INVENTOR.
WILSON GREATBATCH

BY

Christel & Bean
ATTORNEYS

INVENTOR.
WILSON GREATBATCH

BY
Christel & Bean
ATTORNEYS

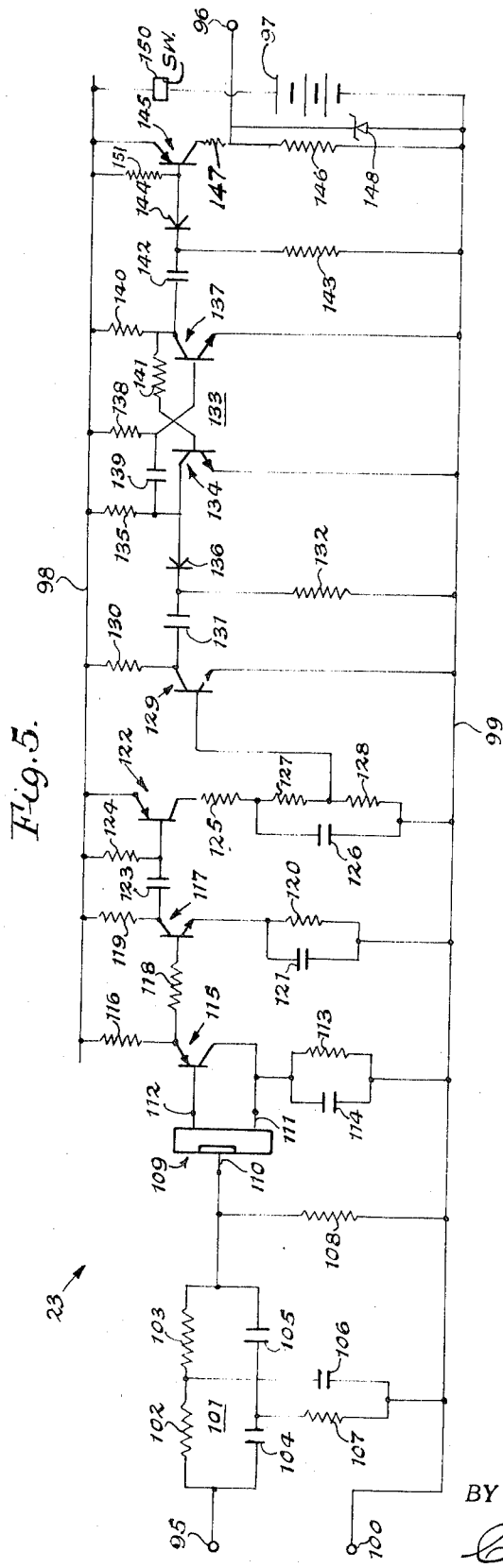

MULTIMODE CARDIAC PACES WITH P-WAVE AND R-WAVE SENSING MEANS

BACKGROUND OF THE INVENTION

This invention relates to electronic cardiac pacer and, more particularly, to a cardiac pacer which may or may not be implantable within the human body and which will respond to the changing needs of the body but will not compete with the natural cardiac electrical activity of any kind.

Electronic cardiac pacemaking began in 1952 with a device demonstrated by Dr. Zoll which was capable of passing a stimulating impulse strong enough to elicit a heart beat through the patient's chest. The Zoll device was limited to short-term applications since the current levels required were of such magnitude that stimulation was accompanied by severe pain and burning of the skin at the electrode site.

The implantable cardiac pacer, shown in U.S. Pat. No. 3,057,356 permits innocuous, painless, long-term cardiac stimulation at low power levels by utilizing a small, completely implanted transistorized and battery-operated pacer connected via flexible electrode wires directly to the myocardium or heart muscle. Such a nonsynchronous pacer, while providing fixed-rate stimulation not automatically changed in accordance with the body's needs, has proven effective in alleviating the symptoms of complete heart block. A nonsynchronous pacer, however, has the possible disadvantage of competing with the natural, physiological pacer during episodes of normal sinus conduction.

As a result there has developed a demand-type pacer, in which case the artificial stimuli are initiated only when required and subsequently can be eliminated when the heart returns to the sinus rhythm. Such a demand pacer is shown in my pending application Ser. No. 455,132, filed May 5, 1965, entitled "CARDIAC IMPLANTABLE PACER," now U.S. Pat. No. 3,478,746, issued Nov. 1969. The demand pacer solves the problem arising in nonsynchronous pacer by inhibiting itself in the presence of ventricular activity but coming "on line" and filling in missed heart beats in the absence of ventricular activity. When the demand pacer comes "on line," it operates as a nonsynchronous pacer, the rate of which is not responsive to atrial activity.

A synchronous or P-wave pacer has been proposed for producing a stimulus following each P-wave or atrial beat. When the body signals a need for increased heart rate, as indicated by an increasing atrial beat, the synchronous pacer responds with an increased ventricular stimulation rate. However, the function of proposed synchronous pacer is not responsive to irregular ventricular ectopic activity and may compete against such beats. Thus, while the synchronous pacer will not compete against normally conducted beats, it can compete against ectopic or abnormally conducted beats. Any competition between the natural and the artificial pacer may be undesirable because such competition may possibly lead to incidents of tachycardia or even fibrillation.

SUMMARY OF THE INVENTION

It is, therefore, an object of this invention to provide an artificial cardiac pacer which is responsive to the changing needs of the human body yet will not compete under any circumstances with natural cardiac electrical activity, normally conducted or ectopic.

It is a more particular object of this invention to provide an artificial pacer which stimulates the heart nonsynchronously in the absence of cardiac electrical activity of any kind, inhibits itself and becomes completely dormant for a suitable interval in the presence of a single ventricular beat, ectopic or conducted, and stimulates the heart synchronously in the presence of atrial activity not accompanied by arrythmic ventricular activity.

It is a further object of this invention to provide such an artificial pacer which can be implanted and which is automatically responsive to cardiac electrical signals, such as R-wave and P-waves, of either polarity.

It is a further object of this invention to provide such an artificial, implantable pacer, the operation of which will not be influenced or impaired by environmental electrical signals such as conventional 60-cycle alternating current.

The present invention provides an artificial cardiac pacer which, in the absence of natural cardiac electrical activity of any kind, provides stimulating electrical pulses to the heart at a predetermined rate. In response to a ventricular beat, either ectopic or conducted and from any source, the pacer inhibits itself and becomes completely dormant for a suitable interval. In response to atrial electrical activity, not accompanied by natural ventricular activity, the pacer provides stimulating pulses suitably delayed and in synchronism with the atrial beats.

The foregoing and additional advantages and characterizing features of the present invention will become clearly apparent upon reading of the ensuing detailed description of an illustrative embodiment thereof together with the included drawings depicting the same.

BRIEF DESCRIPTION OF THE DRAWINGS

FIG. 5 is a schematic diagram of the second signal responsive circuit included in the system of FIG. 2.

DETAILED DESCRIPTION OF THE ILLUSTRATED EMBODIMENT

Figure 1:
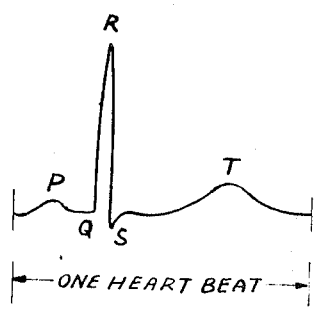
FIG. 1 illustrates the voltage wave produced by a human heart during one complete heart beat.

The human heart beat is represented electrically as a complex wave consisting of what are designated "P," "Q," "R," "S" and "T" waves all as shown in FIG. 1. The P-wave electrically represents an atrial beat associated with atrial depolarization which beat commands heart rate as a function of signals from the rest of the body. The major and most pronounced electrical pulse in the heart is the R-wave and is normally of a magnitude between 2 to 20 millivolts in the ventricle. The R-wave, which stimulates ventricular contraction, typically has an amplitude relation to the P-wave of at least three to one. The R-wave normally is generated by depolarization of the ventricles, but when not so produced due to some cardiac malfunction, it is the function of the artificial pacer to provide periodic electronic pulses to the heart to supply a missing R-wave. If both the natural and artificial pacer supply an R-wave, however, competition for control of the heart results and a possibly dangerous situation arises when the pacer electronic pulse occurs in a T-wave region. The T-wave portion of each complete heart beat follows the R-wave or major beat pulse thereof by about 0.3 seconds. Within the T-wave is a critical interval known as the "vulnerable period" and, in the case of a highly abnormal heart, a pacer impulse falling into this period can conceivably elicit bursts of tachycardia or fibrillation which are undesirable and may even lead to fatal sequence of arrythmias.

Figure 2:
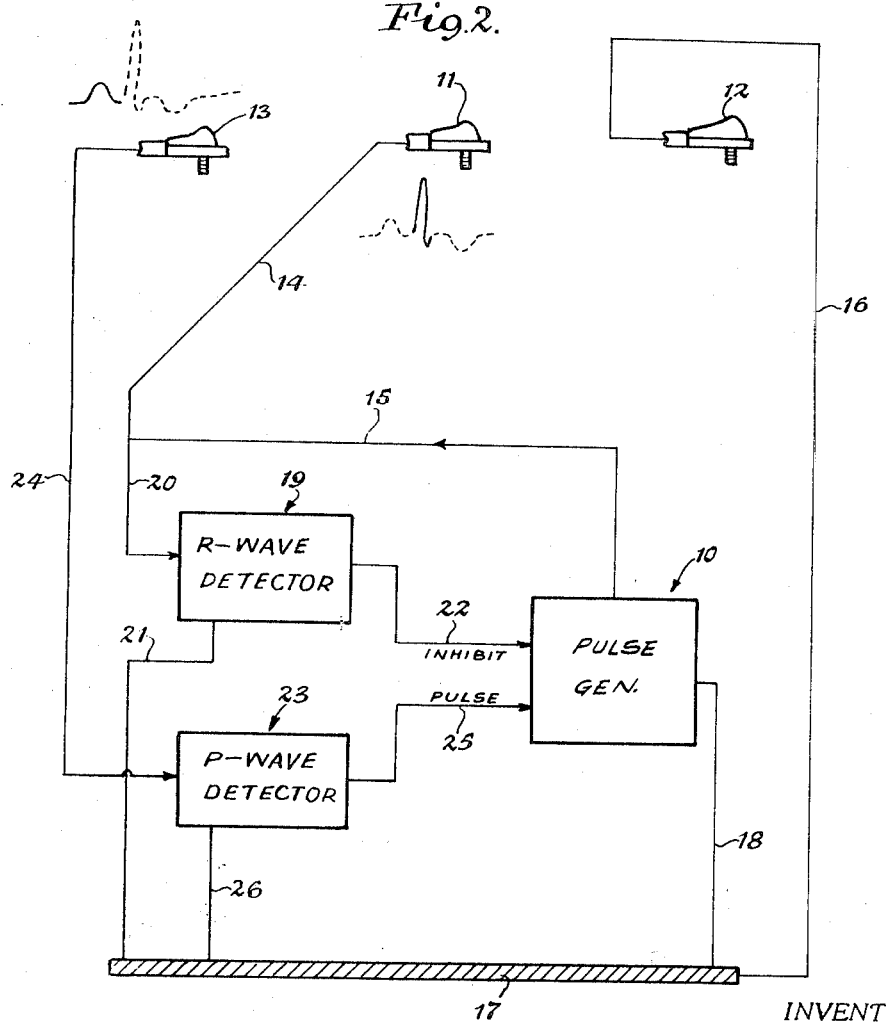
FIG. 2 is a block diagram illustrating a preferred embodiment of an artificial pacer according to the present invention.

FIG. 2 shows in block diagram form an artificial cardiac pacer constructed in accordance with the present invention. The pacer includes pulse generating means 10 for providing stimulating pulses to the heart under certain conditions and at a preset rate controlled by timing means included therein. A first electrode 11 is coupled to pulse generating means 10 and is adapted to be operatively connected to a patient's heart on or in the ventricle thereof. A second electrode 12, which functions as a reference or indifferent electrode, can be placed in contact with another portion of the patient's body or even with a selected portion of the patient's heart. The pacer includes a third electrode 13 adapted to be operatively connected to a patient's heart on or in the atrium thereof. This electrode is coupled to another component of the pacer as will be described presently.

The electrode arrangement shown is preferred, although others can be substituted without departing from the spirit and scope of the present invention. Only one ventricular electrode 11 is needed and is placed surgically on or in the ventricle of the heart. The single reference electrode 12 can be subcutaneously implanted. The electrodes can comprise, for example, myocardial wires or plates or can be of the salt-bridge type. In preferred form, electrodes 11 and 12 are of the type which provide a sensing function as well as a driving function, although a separate electrode structure for sensing ventricular electrical signals can be provided. Electrode 13 is placed surgically on or in the atrium of a patient's heart.

Electrode 11 is coupled through leads 14 and 15 to pulse generating means 10. Electrode 12 is coupled through a lead 16, a ground plate 17 connected thereto, and a lead 18 to pulse generating means 10. Plate 17, which is included in the pacer, serves an electrical ground with electrode 12 for pulse generating means 10 and also as a ground for other circuit components of the pacer as will be described presently.

The pacer provided by the present invention also comprises a first signal responsive means 19 which is responsive to ventricular electrical signals in the heart and thus also may be called an R-wave detector. Signal responsive means 19 is coupled to ventricular electrode 11 through a lead 20 and lead 14 and to electrode 12 through a lead 21 which is connected to ground plate 17. Signal responsive means or R-wave detector 19 is operatively connected through a lead 22 to pulse generating means 10, and a ventricular signal, such as an R-wave, produced in the heart is sensed by means 19, the signal is amplified therein, and pulse generating means 10 is inhibited or recycled so that no stimulating pulse will be sent to the heart by the artificial pacer. A detailed description of the circuitry and operation of signal responsive means 19 will be presented further on in the specification.

The pacer additionally comprises a second signal responsive means 23 which is responsive to natural atrial beats of the heart and may be designated a P-wave detector. Signal responsive means 23 is coupled to atrial electrode 13 by a lead 24, is operatively connected to pulse generating means 10 through a lead 25, and is connected to ground plate 17 through line 26. Signal responsive means or P-wave detector 23 includes timing means so that each natural atrial beat causes means 23 to provide an amplified and time-delayed signal for activating pulse generating means 10 a predetermined time after the atrial beat and coordinated therewith.

The pacer is provided with suitable power supply means such as a battery (FIG. 3) for operating pulse generating means 10 and first and second signal responsive means 19 and 23. In addition, the pacer of the present invention can be either of the external type or implanted within the human body. To be implanted, the entire pacer, including its battery, which can be rechargeable, is encased in an envelope of a moistureproof and human body reaction-free material such as silicone rubber or suitable plastic so as to permit long-term implantation within the human body. Similar material is employed also to envelope leads 14, 16 and 24 extending between the pacer circuit components and electrodes 11, 12 and 13, respectively. The aforementioned U.S. Pat. No. 3,057,356 can be referred to for additional information pertaining to the structural details of implanted pacer.

The operation of the artificial pacer shown in FIG. 2 is as follows. If no atrial or ventricular electrical activity occurs, the pacer will stimulate the ventricle at a preset rate. In particular, when no natural R-waves are sensed by ventricular electrode 11, and no P-waves are sensed by atrial electrode 13, signal responsive means 19 and 23 are in a quiescent state. Following an unavoidable inherent refractory time such as 100 milliseconds which follows each stimulation impulse generated by the pulse generating means 10, pulse generating means 10 operates to provide an output of stimulating pulses which appear between electrodes 11 and 12. The pulses occur at a rate determined by adjustable timing means included within generating means 10, the detailed construction and operation of which will be described further on in the specification. Thus, in this mode, when cardiac electrical activity is absent, the device functions as a nonsynchronous pacer without reference to any external inputs.

The R-wave stimulated in the heart by the artificial pacer will, of course, be sensed by electrode 11 and activate signal responsive means 19. This, in turn, results in signal generating means 10 being inhibited for about one second following the R-wave. The reason for this is to prevent the occurrence of stimulating impulses during the T-wave portion of the heart beat period.

In response to a ventricular beat, either ectopic or normally conducted and from any source, the pacer inhibits itself and becomes completely dormant for a suitable interval. In this mode, operation is that of a demand pacer. Should any ectopic activity occur, the pacer goes "off line" and remains dormant until such time as all ventricular cardiac electrical activity has ceased for about one second. More particularly, electrical signals indicative of ventricular activity such as conducted R-waves or ectopic signals, are picked up by electrode 11 with the result that signal responsive means 19 is activated. In addition, signal responsive means 19 is responsive to cardiac electrical signals of either polarity, due to a strong mathematical differentiation in its circuit. Activation of means 19, in turn, provides a signal on line 22 which inhibits pulse generating means 10 or, more specifically, which causes a recycling of generating means 10.

In response to an atrial beat without any ventricular activity of any kind, natural or ectopic, the pacer provides a ventricular stimulation impulse following each sensed P-wave by a suitable interval. In other words if atrial activity is present and not accompanied by natural ventricular activity, the pacer will generate ventricular stimuli, synchronized with and delayed behind each P-wave. The pulse generating means 10 contains timing means and a trigger input amplitude so selected that a premature P-wave will fail to trigger the pulse generating means 10. This selection provides an inherent refractory period or "lockout" in the synchronized mode, as described in the next paragraph, that effectively limits the rate at which the pacer can be driven in the synchronous mode. In particular, the occurrence of an atrial P-wave is sensed by electrode 13, and the signal is transmitted over line 24 to signal responsive means 23, or P-wave detector, where it is amplified and delayed. The delayed signal is then transmitted over line 25 to pulse generating means 10, whereupon a heart-stimulating pulse is generated and then transmitted to the heart through electrodes 11, 12. The heart stimulating pulse is properly delayed about 0.12 seconds behind the sensed P-wave and synchronized to it.

Thus, the artificial pacer shown in FIG. 2 is responsive to the changing needs of the body, yet will not complete, under any circumstances, with natural cardiac electrical activity either conducted or ectopic. Some hazard could exist from permitting signal responsive means or P-wave detector 23 to fire the pulse generator 10 at any random time. Should a P-wave occur about 180 milliseconds after a stimulated R-wave, a second stimulated R-wave could occur one P-R interval later and might fall within the vulnerable zone of the T-wave. Although such an event is physiologically unlikely, such an eventuality is eliminated by a lockout of P-wave detector 23 for some suitable time following an R-wave. This same feature places a limit on the rate at which the artificial pacer can run synchronously. If two P-waves are sensed in rapid succession, only the first will activate the pulse generator 10 and the second will be locked out. As the atrial rate rises even further only every third P-wave will activate pulse generator 10. A suitable lockout period would be 500 milliseconds, limiting the maximum synchronous rate to 120 beats per minute.

Thus if the atrial rate rises above 120 beats per minute, the pulse stimulation means 10 will operate in response only to every other P-wave. If, on the other hand 1 second elapses with no atrial or ventricular activity, the pacer will operate in the freerunning mode. But under no conditions can either synchronous or nonsynchronous pacer operation provide stimulation impulses during the T-wave portion of the heart beat period. In addition, the use of separate electrodes placed on the ventricle and on the atrium of the heart to sense R-waves and P-waves, respectively, advantageously utilizes the positional amplitude differentiation associated with the two types of heart signals. This plus the fact that the frequency spectrum of R-waves and P-waves each are accommodated only by a corresponding one of the signal responsive means 19 and 23, respectively, enhances the operational capability and efficiency of the artificial pacer.

Figure 3:
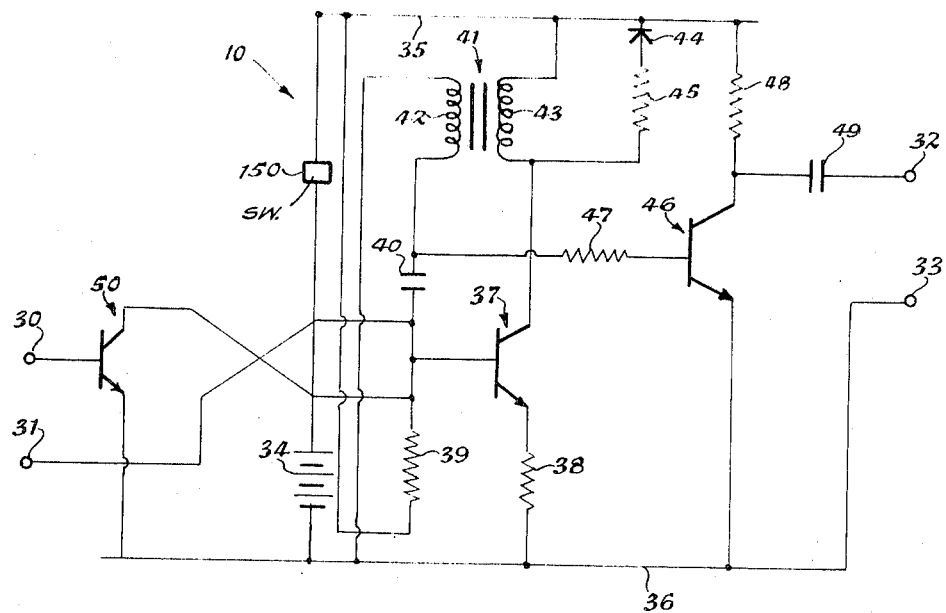
FIG. 3 is a schematic diagram of the pulse generating circuit included in the system of FIG. 2.

The structure and operation of the various circuit components of the pacer system shown in FIG. 2 will be described now in detail. A preferred circuit arrangement for pulse generating means 10 is shown in FIG. 3. The circuit 10 includes two input terminals 30 and 31 adapted to be connected to lines 22 and 25, respectively, shown in FIG. 2, and two output terminals 32 and 33 adapted to be connected to lines 15 and 18, respectively. A source of electrical power in the form of battery 34 is provided and connected between a positive supply voltage line 35 and a ground potential line 36 which itself is connected to terminal 33. Although a separate battery is shown for pulse generating means 10 and will be shown for first and second signal responsive means 19 and 23, respectively, this is merely for convenience in illustration. Preferably a single battery would be included to provide electrical power for all three circuit components in a compact arrangement, especially when the pacer is of the type to be implanted within the human body.

Pulse generating means 10 is operable on low power and includes an oscillator transistor 37 the emitter of which is connected through a resistor 38 to ground conductor 36. The base of transistor 37 is connected through a timing capacitor 40 to a transformer 41, in particular to one end of a secondary winding 42 thereof. The other end of secondary winding 42 is connected to ground conductor 36. The primary winding 43 of transformer 41 is connected between the collector of transistor 37 and positive supply voltage conductor 35. A transient protection diode 44 and current limiting resistor 45 are connected between supply voltage conductor 35 and the collector of transistor 37 in parallel with primary winding 43.

Pulse generating means 10 also includes an amplifier transistor 46 having its control or base terminal connected through a resistor 47 to the junction of timing capacitor 40 and secondary winding 42. The collector of transistor 46 is connected through a resistor 48 to supply voltage conductor 35. An output capacitor 49 is connected between the collector of transistor 46 and terminal 32. Pulses generated by the means 10 appear between terminals 32, 33 and thus between electrodes 11, 12 one being placed on or in the ventricle of a patient's heart. The emitter of transistor 46 is connected directly to ground conductor 36.

Signal generating means 10 also includes a semiconductor switch in the form of transistor 50, the control or base terminal of which is connected to input terminal 30. The collector of transistor 50 is connected to the junction of resistor 39 and the base or control terminal of oscillator transistor 37. The emitter terminal of transistor 50 is connected directly to ground conductor 36. Input terminal 3 is connected directly to the junction of timing capacitor 40 and the base or control terminal of oscillator transistor 37.

Pulse generating means 10 operates as follows. When no natural or ectopic cardiac electrical activity occurs, no signals appear on input terminals 30, 31. Current flowing from battery 34 through resistor 39 charges timing capacitor 40, and at the same time output capacitor 49 charges to a voltage level near that of battery 34 and electrodes 11 and 12 both assume ground potential. After a time predetermined by the values of resistor 39 and capacitor 40 which comprise an R-C timing circuit, the voltage at the base of transistor 37 reaches a level sufficient to forward bias the base-emitter junction thereof.

The turning on of transistor 37, in turn, provides a path for the flow of current through transformer primary winding 43, the collector-emitter path of transistor 37, and resistor 38. As a result, a voltage is induced in transformer secondary winding 42 which turns on transistor 46 and drives transistor 37 rapidly into saturation.

When transistor 46 turns on, the collector thereof is at nearly ground potential. Since the voltage across capacitor 49 cannot change instantaneously, ventricular electrode 11, being connected to terminal 32, is driven negatively by an amount nearly equal to the supply voltage, and capacitor 49 discharges through the collector-emitter circuit of transistor 46 causing a current to flow from electrode 12 (which is connected to terminal 33) to electrode 11.

While transistor 37 is on, capacitor 40 discharges and recharges partially in the opposite direction. Transformer 41 saturates and the field created about primary winding 43 begins to collapse, immediately reversing the polarity of voltage on secondary winding 42. This polarity reversal, in turn, drives transistors 37 and 46 immediately into cutoff which terminates the stimulating pulse provided by the pacer, preferably about 0.50 to 2.0 milliseconds after beginning of the pulse. The reverse charge on capacitor 40 maintains transistor 37 in the cutoff state until the charge is again reversed by current flowing from battery 34 through resistor 39. As transistor 46 turns off, capacitor 49 begins to charge through resistor 48, and a slow charge current flows from terminal 32 to terminal 33 and thus from electrode 11 to electrode 12 until capacitor 48 is fully charged. A nonsymmetrical, biphasic current flow thus results between electrodes 11 and 12.

The pacer stimulation pulse rate is dependent upon the values of timing capacitor 40 and resistor 39 and preferably is about one pulse per second. The pulse rate is adjustable conveniently when resistor 39 is of the variable type, and the pacer can be designed so that rate adjustment can be performed after implantation with percutaneous needle.

The pulse generating means 10 continues operation in this free-running mode at a predetermined rate in the absence of signals on input terminals 30, 31. When, however, signal generating means 19 provides an output on line 22, as when a natural or pacer stimulated R-wave is sensed, or when ventricular ectopic signals occur, the resulting signal on terminal 30 activates transistor 50. Transistor 50 remains on long enough, for example about 20 milliseconds, to assure that timing capacitor 40 is discharged to the proper level. In other words, transistor 50 by discharging capacitor 40 prevents the voltage on the base terminal of transistor 37 from reaching the value needed to forward bias the base-emitter junction thereof, such voltage level being required to generate pacer pulses on electrodes 11, 12.

When, on the other hand, signal generating means 23 provides an output on line 25, in response to the occurrence of P-waves, the resulting signal on terminal 31 will turn on transistor 37 if a signal is not present at terminal 30. This, in turn, causes signal generating means 10 to provide stimulating pulses at a rate synchronized with the natural atrial beats of the heart.

Figure 4:
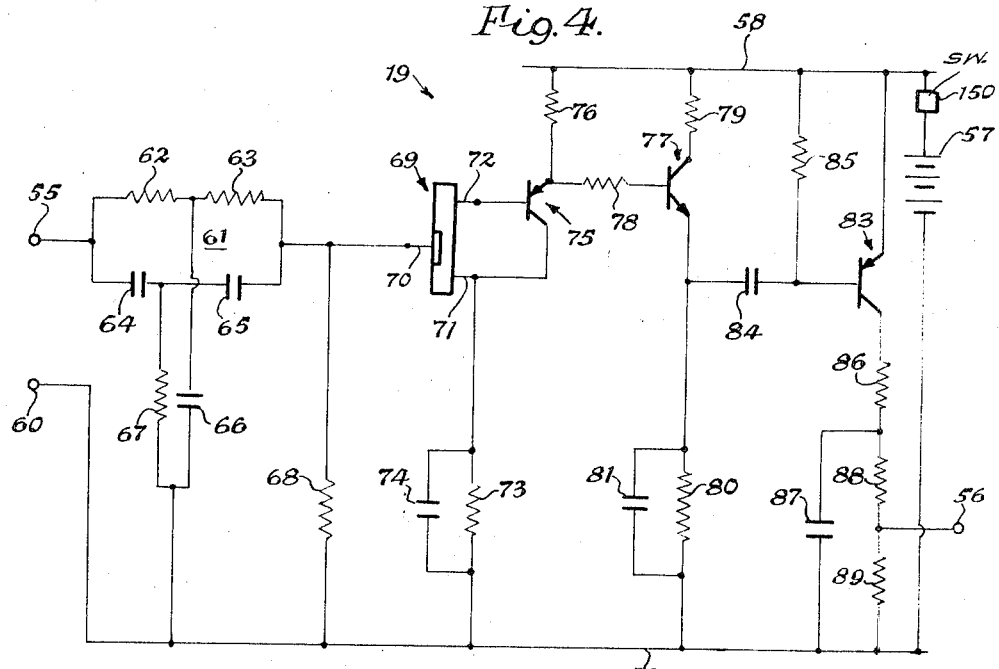
FIG. 4 is a schematic diagram of the first signal responsive circuit included in the system of FIG. 2.

FIG. 4 reveals a preferred circuit arrangement for signal responsive means 19, one function of which is to sense ventricular electrical signals of either polarity. The circuit 19 includes an input terminal 55 adapted to be connected to lead 20 and an output terminal 56 adapted to be connected to lead 22. A source of electrical power in the form of battery 57 is provided and connected between a positive supply voltage conductor 58 and a ground potential conductor 59. Ground conductor 59 is connected to a third terminal 60 which, in turn, is connected through line 21 to ground plate 17.

Signal responsive means 19 includes a notch-type filter 61 comprising a first branch consisting of series-connected resistors 62, 63 connected in parallel with series-connected capacitors 64, 65. Filter 61 also comprises a second branch consisting of capacitor 66 connected between the junction of resistors 62, 63 and ground conductor 59 and resistor 67 connected between the junction of capacitors 64, 65 and ground conductor 59. The voltage output of filter 61 appears across a load resistor 68 which is connected between the junction of resistor 63 and capacitor 65 and ground conductor 59. Filter 61 is designed to transmit all signals except those having a frequency of about 60 c.p.s. Typical values for the components thereof are as follows: resistors 62 and 63, 300k; resistor 67, 150K; capacitors 64 and 65, 0.01 u f.; capacitor 66, 0.02 u f. By rejecting signals having a frequency of around 60 c.p.s., filter 61 prevents the pacer from being influenced or impaired by ordinary household electrical current, which the patient may on occasion be exposed to.

Resistor 68 is also an input resistor for a first semiconductor amplifier stage including field effect transistor 69 having gate electrode 70 and source and drain electrodes 71 and 72, respectively. The field effect transistor is a voltage-controlled semiconductor device and, in addition, can operate suitably with a high input resistance, for example in the range 1–100 Megohms. Gate electrode 70 of transistor 69 is connected to the junction of resistor 68 and filter 61, and source terminal 71 is connected through the parallel combination of resistor 73 and bypass capacitor 74 to ground conductor 59. Drain electrode 72 is connected to the input or base terminal of a second semiconductor amplifier stage comprising transistor 75, the collector terminal of which is connected to source terminal 71 of transistor 69. A current limiting resistor 76 is connected between supply voltage conductor 58 and the emitter of transistor 75.

A third semiconductor amplifier in the form of transistor 77 is included, the base terminal of which is connected through a resistor 78 to the emitter terminal of transistor 75. The collector terminal of transistor 77 is connected through a resistor 79 to supply voltage conductor 58, and the emitter terminal of transistor 77 is connected to ground conductor 59 through a parallel combination of a resistor 80 and a bypass capacitor 81. Transistor 77 is connected in common emitter configuration.

The signal responsive means also includes semiconductor switching means in the form of transistor 83, the base terminal of which is connected through a coupling capacitor 84 to the output of amplifier transistor 77. The base terminal of switching transistor 83 also is connected through a resistor 85 to supply voltage conductor 58, and the emitter terminal of transistor 83 is connected directly to supply conductor 58. The collector terminal of switching transistor 83 is connected through a resistor 86 and a capacitor 87 to ground conductor 59. A voltage divider including resistors 88 and 89 is connected between resistor 86 and ground conductor 59 and thus in parallel with capacitor 87. Output terminal 56 of signal responsive means 19 is connected to the junction of resistors 88 and 89.

Signal responsive means 19 operates in the following manner to sense each natural R-wave, ectopic ventricular signals, and the signal generated in the heart in response to each pacer pulse. Ventricular electrical activity, as sensed by electrode 11 which is connected by leads 14 and 20 to input terminal 55, is indicated by a pulse of positive or negative polarity appearing on terminal 55. The pulse is transmitted through filter 61 and amplified by field effect transistor 69 and by amplifier transistor 75 and mathematically differentiated by resistor 73 and capacitor 74. The pulse is amplified further and further differentiated by the combination of transistor 77, resistors 79 and 80, and capacitor 81. The parallel combination of resistor 80 and capacitor 81 is still another differentiating network which further aids in transforming the monopolar signal of either polarity into a bipolar signal. The order in which the positive and negative going portions of the bipolar signal are generated depends upon the polarity of the input pulse.

The negative going portion of the bipolar signal appearing on the collector of transistor 77 is shaped by capacitor 84 and resistor 85, and the resulting signal turns on switching transistor 83. The turning on of transistor 83 provides a pulse on output terminal 56, which pulse is transmitted through lead 22 to the base terminal of switching transistor 50 included in signal generating means 10. Capacitor 87 and resistor 88 function as a pulse shaping network for this pulse which activates transistor 50. The network is designed to provide a pulse width such that transistor 50 stays on long enough, for example about 20 milliseconds, to assure that timing capacitor 40 in signal generating means 10 is discharged to the proper level. Thus, in response to R-waves produced naturally by the heart when it is beating normally, pulse generating means 10 is continually reset and does not provide stimulating pulses to the heart.

When stimulated by a pacer pulse, the heart and the electrode contacts to it react as a complex impedance containing reactive components which along with delays in circuit recovery from saturation provide a refractory period of about 100–200 milliseconds after the pacer pulse. Any R-wave arriving after that time activates signal responsive means 19 to turn on switching transistor 50 in pulse generating means 10. This, in turn, discharges timing capacitor 40 to reset pulse generating means 10 and prevent stimulating pulse from occuring during the T-wave portion of the heart period or cycle.

If the heart should be beating normally and then skip a beat, the pacer will insert a stimulating pulse. The R-wave from the last natural heartbeat is sensed by signal responsive means 19 and causes a discharge of timing capacitor 40 in pulse generating means 10. Capacitor 40 then begins the next charging cycle and is not discharged again. The total elapsed time between the last natural heartbeat and the first pacer stimulating pulse is the charge time of capacitor 40 to the level required to turn on oscillator transistor 37. This, of course, assumes negligible transit time of the R-wave through the circuit of signal responsive means 19.

Thus, when the heart is not beating naturally and successive pacer pulses are generated, the heartbeat generated by each pacer pulse is also sensed and amplified by signal responsive means 19 and utilized to activate transistor 50 which, in turn, discharges timing capacitor 40 to a reference level near ground potential. Timing capacitor 40 then begins charging toward a voltage level sufficient to activate oscillator transistor 37.

FIG. 5 reveals a preferred circuit arrangement for signal responsive means 23, the function of which is to sense P-waves of either polarity and in response thereto provide a delayed signal on line 25 for activating pulse generating means 10. The circuit 23 includes an input terminal 95 adapted to be connected to lead 24 and an output terminal 96 adapted to be connected to lead 25. A source of electrical power in the form of battery 97 is provided, and is connected between a positive supply voltage conductor 98 and a ground potential conductor 99. Ground conductor 99 is connected to a third terminal 100 which is connected to ground plate 17 through lead 26.

Signal responsive means 23 includes a filter 101 connected to input terminal 95 for the same purpose that filter 61 is included in R-wave detector 19, i.e., to prevent potentially dangerous interference with pacer operation by 60-cycle alternating current. Filter 101 comprises a first branch consisting of series connected resistors 102, 103 connected in parallel with series-connected capacitors 104, 105. Filter 101 also comprises a second branch consisting of capacitor 106 connected between the junction of resistors 102, 103 and ground conductor 99 and resistor 107 connected between the junction of capacitors 104, 105 and ground conductor 99. Since filter 101 also is designed to reject signals having a frequency of around 60 c.p.s., the components thereof can have the same magnitudes as those of filter 61, previously described.

The voltage output of filter 101 appears across a load resistor 108 connected between the junction of resistor 103 and capacitor 105 and ground conductor 99. Resistor 108 also is an input resistor for a first semiconductor amplifier stage including field effect transistor 109 having gate electrode 110 and source and drain electrodes 111 and 112, respectively.

Transistor 109 is included in the circuit for the same reasons that field effect transistor 69 is provided in the circuit of signal responsive means 19. Gate electrode 110 of transistor 109 is connected to the junction of resistor 108 and filter 101, and source terminal 111 is connected through the parallel combination of resistor 113 and bypass capacitor 114 to ground conductor 99. Drain electrode 112 is connected to the base terminal of a second semiconductor amplifier stage comprising transistor 115, the collector terminal of which is connected to source terminal 111 of transistor 109. A load resistor 116 is connected between supply voltage conductor 98 and the emitter of transistor 115.

A third stage semiconductor amplifier in the form of transistor 117 is included, the base terminal of which is connected through a resistor 118 to the emitter terminal of transistor 115. The collector terminal of transistor 117 is connected through a resistor 119 to supply voltage conductor 98, and the emitter terminal of transistor 117 is connected to ground conductor 99 through a parallel combination of resistor 120 and a bypass capacitor 121.

The circuit arrangement thus described amplifies the input signal received and converts it from a monopolar signal of either polarity into a bipolar signal by mathematical differentiation. The next stage of signal responsive means 23 functions to transform this bipolar signal into a trigger pulse, and includes a switching transistor 122, the base terminal of which is connected through a coupling capacitor 123 to the collector terminal of transistor 117. The base terminal of switching transistor 122 also is connected through a resistor 124 to supply voltage conductor 98, and the emitter terminal of transistor 122 is connected directly to supply conductor 98. The collector terminal of switching transistor 122 is connected through a resistor 125 and a capacitor 126 to ground conductor 99. A voltage divider including resistors 127, 128 is connected between resistor 125 and ground conductor 99 and thus in parallel with capacitor 126.

The values of capacitor 126 and resistors 127, 128 are selected such that repetitive signals above a certain rate such as perhaps 20 cps. and exemplified by ignition noise, radar impulses etc., will result in a charging of capacitor 126 and a cutting off of transistor 122, thus making the amplifier unresponsive to fast and repetitive pulsating signals. Signal responsive means 19 also is provided with a similar circuit for this purpose comprising capacitor 87 and resistors 88, 89.

The component or stage for producing a trigger pulse further includes an inverter stage comprising transistor 129, the base terminal of which is connected to the junction of resistors 127 and 128. The collector terminal of transistor 129 is connected through a resistor 130 to supply voltage conductor 98, and the emitter terminal thereof is connected directly to ground conductor 99. The collector terminal of inverter transistor 129 is connected to one terminal of a capacitor 131, the other terminal of which is connected through a resistor 132 to ground conductor 99. Capacitor 131 and resistor 132 differentiate the pulse output of inverter transistor 129 to provide a sharp trigger pulse for the next circuit stage.

The next circuit component or stage is a timing means 133 which in response to the occurrence of a trigger pulse provides an output pulse having a predetermined width after a predetermined time delay. Timing means 133 is a multivibrator-type circuit and includes a first transistor 134, the collector terminal of which is connected through a resistor 135 to supply voltage conductor 98. The collector terminal also is connected to the anode of a diode 136, the cathode of which is connected to the junction of capacitor 131 and resistor 132. Diode 136 thus is connected so as to allow conduction only of negative-going trigger pulses to timing means 133. The emitter terminal of transistor 134 is connected directly to ground conductor 99. Timing means 133 includes a second transistor 137, the base terminal of which is connected through a resistor 138 to supply voltage conductor 98. The base terminal of transistor 137 also is connected through a timing capacitor 139 to the junction of resistor 135 and the collector terminal of transistor 134. The collector terminal of transistor 137 is connected through a resistor 140 to supply voltage conductor 98 and through a resistor 141 to the base terminal of transistor 134.

The output of timing means 133 is differentiated and inverted by a pulse shaping means whereupon a pulse output is provided on terminal 96. The collector terminal of transistor 137 is connected to one terminal of a capacitor 142, the other terminal of which is connected through a resistor 143 to ground conductor 99. Capacitor 142 and resistor 143 comprises a differentiating network which operates on the delayed pulse output provided by timing means 133. A diode 144, the cathode of which is connected to the junction of capacitor 142 and resistor 143, allows transmission of only the negative-going portions of the differentiated signal. An inverter stage comprises transistor 145, the base terminal of which is connected to the anode of diode 144 and, through a resistor 151 to the supply voltage conductor 98. The emitter terminal of transistor 145 is connected directly to supply voltage conductor 98, and the collector terminal thereof is connected through resistors 146 and 147 to ground conductor 99. The junction of resistors 146, 147 is connected to output terminal 96, and a Zener diode 148 is connected from this junction to ground.

Signal responsive means 23 operates in the following manner to sense each natural P-wave generated in the atrium of the heart and to provide a delayed output pulse in response thereto. Atrial electrical activity, as sensed by electrode 13 which is connected by lead 24 to input terminal 95, is indicated by a monopolar pulse of positive or negative polarity appearing on terminal 95. The pulse is transmitted through filter 101 and amplified by field effect transistor 109 and by amplifier transistor 115. The monopolar pulse is amplified further and converted into a bipolar signal by the combination of transistor 117, resistors 119 and 120, and capacitor 121 and other elements. The differentiation is performed in a manner similar to the differentiation by the corresponding portion of signal responsive means 19.

The negative-going portion of the bipolar signal appearing on the collector of transistor 117 is shaped by capacitor 123 and resistor 124, and the resulting signal turns on switching transistor 122. The turning on of transistor 122 provides an output pulse which is transmitted from resistors 127, 128 to the base terminal of transistor 129 which inverts the pulse. The negative-going, sharp trigger pulse provided by capacitor 131 and resistor 132 passes unimpeded through diode 136 and capacitor 139, turning off transistor 137 which is biased so as to be normally on. The collector of transistor 137 rises, cutting off diode 144 and driving transistor 134 into hard conduction, transistor 134 being biased so as to be normally off. The resulting voltage drop at the collector of transistor 134 reflexly further cuts off transistor 137 and cuts off diode 136, making the latter unresponsive to any trailing edge of the input pulse. Capacitor 139 then charges through resistor 138 and the collector-emitter path of transistor 134 until the conduction threshold of the base of transistor 137 is reached. Transistor 137 then reflexly conducts and delivers a delayed negative pulse through diode 144 to the base of transistor 145. The magnitude of the time delay is determined by the values of capacitor 139 and resistor 138 which are selected to provide a delay of 120 milliseconds.

The lowering of the potential on the base terminal of transistor 145 turns it on which results in a positive-going pulse appearing on output terminal 96. This pulse, it will be recalled, will turn on transistor 37 in pulse generating means 10 in the absence of ventricular activity. Continued absence of natural R-waves in the heart will result in pulses synchronized to the occurrence of P-waves in the atrium.

During synchronous operation, however, a pacer stimulating pulse will not occur during the T-wave portion of the heart beat. This is because resistor 147 and Zener diode 148 comprise a lockout circuit and act to limit the output of signal responsive means or P-wave detector 23 to a pulse amplitude somewhat less than the amplitude required to fire pulse generator 10 early in the recycle period of generator 10. Later in the recycle period, the voltage at the base of transistor 37 in FIG. 3 will have risen to a point where the pulse amplitude of the output of P-wave detector 23 is sufficient to produce a delayed R-wave.

In some circumstances it may be desired to disable the system or switch between the three pacer modes, i.e., nonsynchronous, demand and synchronous, manually rather than automatically. A switch can be provided to activate only pulse generating means 10 for continual, nonsynchronous operation. Having the switch set for activation of both signal generating means 10 and signal responsive means 19 would produce a continual demand mode. Switching power to the generating means 10 and responsive means 23 would provide a continual synchronous mode. The switch would have also a position whereby simultaneous or multi-mode operation is provided. A multiposition switch for accomplishing this selective operation is indicated schematically at 150 in FIGS. 3-5, and functions, simply, to control selectively the application of power form the supply to the three circuits 10, 19 and 23. Such a switch could be an R-F activated solid-state semiconductor, a magnetically activated reed switch or switches, or can be percutaneously operated.

From the foregoing it is apparent that the present invention accomplishes its intended objects. An artificial pacemaker constructed in accordance with the present invention is responsive to the changing needs of the body yet will not compete under any circumstances with natural cardiac electrical activity, normally conducted or ectopic. While a single specific embodiment of the invention has been described, this has been done by way of illustration, without thought of limitation.

I claim:

1. A cardiac pacer comprising:
   a. pulse generating means including timing means controlling the generation of pulses;
   b. first and second electrodes coupled to said pulse generating means, at least one of said electrodes adapted to be operatively connected to a patient's heart on or in the ventricle thereof;
   c. a third electrode adapted to be operatively connected to a patient's heart on or in the atrium thereof;
   d. first signal responsive means coupled to at least the ventricular one of said first and second electrodes and responsive to electrical signals in the ventricle of the heart, said signal responsive means being operatively connected to said pulse generating means so that a ventricular electrical signal causes said signal responsive means to reset said timing means to a predetermined level;
   e. second signal responsive means coupled to said third electrode and responsive to electrical signals in the atrium of the heart, said second signal responsive means including timing means and being operatively connected to said pulse generating means so that each natural atrial beat causes said second signal responsive means to activate said pulse generating means a predetermined time after the atrial beat and coordinated with the natural beat;
   f. said first signal responsive means including means for inhibiting activation of said pulse generating means by said second signal responsive means for a predetermined time following the occurrence of a natural ventricular beat; and
   g. electrical power supply means connected to said pulse generating means and to said first and second signal responsive means.

2. A totally implantable cardiac pacemaker according to claim 1 which further includes moistureproof, human body reaction-free enclosure means enveloping said pulse generating means, said first and second signal responsive means, and said power supply means.

3. The cardiac pacer according to claim 1 wherein said pulse generating means including timing means comprises:
   a. a semiconductor pulse generator;
   b. an R-C timing circuit connected to said power supply and to said pulse generator for controlling the generation of pulses; and
   c. a semiconductor switch connected to and controlled by said first signal responsive means and operatively connected to said R-C timing circuit for preventing said R-C circuit from reaching a predetermined voltage level in response to electrical signals in the ventricle of the heart.

4. The cardiac pacer according to claim 3 wherein the output of said second signal responsive means is connected to said R-C timing circuit for controlling the generation of pulses.

5. The cardiac pacer according to claim 1 wherein said first signal responsive means includes means responsive to cardiac electrical signals of either polarity.

6. The cardiac pacer according to claim 5 wherein said first signal responsive means comprises:
   a. a plurality of semiconductor amplifier stages;
   b. signal transmission means connected to the input of the first of said semiconductor amplifier stages;
   c. means connected to the output of the last of said semiconductor amplifier stages for converting a monopolar input signal of either polarity into a bipolar output signal; and
   d. semiconductor switching mean having a control terminal coupled to the output of said signal converting means and connected between said power supply and said pulse generating means.

7. The cardiac pacer according to claim 6 wherein said signal transmission means comprises a filter network adapted to reject signals having a frequency of around 60 cycles per second.

8. The cardiac pacer according to claim 6 wherein said signal converting means comprises an R-C differentiating circuit.

9. The cardiac pacer according to claim 7 wherein the first of said semiconductor amplifier stages includes a field-effect transistor, the gate terminal of which is connected to the output of said filter network.

10. The cardiac pacer according to claim 1 wherein said second signal responsive means comprises:
    a. a plurality of semiconductor amplifier stages;
    b. signal transmission means connected to the input of the first of said semiconductor amplifier stages;
    c. means connected to the output of the last of said semiconductor stages for converting a monopolar input signal of either polarity into a bipolar output signal;
    d. trigger pulse producing means connected to the output of said signal converting means;
    e. a circuit connected to said trigger pulse producing means and operative in response to the occurrence of a trigger pulse for providing an output pulse having a predetermined width after a predetermined time delay; and
    f. pulse amplitude limiting means connected to the output of said circuit.

11. The cardiac pacer according to claim 10 wherein said signal transmission means comprises a filter network adapted to reject signals having a frequency of around 60 cycles per second.

12. The cardiac pacer according to claim 10 wherein said signal converting means comprises an R-C differentiating circuit.

13. The cardiac pacer according to claim 10 wherein said circuit responsive to a trigger pulse comprises:
    a. a first semiconductor switch connected to the output thereof.
    b. an R-C timing circuit connected to the input thereof and to the control terminal of said first semiconductor switch; and
    c. a second semiconductor switch connected to and controlled by said first semiconductor switch and providing a conduction path for said R-C circuit.

14. The cardiac pacer according to claim 11 wherein the first of said semiconductor amplifier stages includes a field effect transistor, the gate terminal of which is connected to the output of said filter network.

15. The cardiac pacer according to claim 1 further including independently operable switching means for selectively connecting said electrical power supply means to said pulse generating means and to said first and second signal responsive means.

16. The cardiac pacer according to claim 6 further including a frequency responsive R-C network connected to the output of said semiconductor switching means for rendering said switching means unresponsive to signals above a predetermined rate.

17. The cardiac pacer according to claim 10 further including a frequency responsive R-C network connected between said converting means and said trigger pulse producing means for rendering said trigger pulse producing means unresponsive to signal above a predetermined rate.

* * * * *